United States Patent [19]
Chappel et al.

[11] Patent Number: 6,078,962
[45] Date of Patent: Jun. 20, 2000

[54] BI-DIRECTIONAL ASYNCHRONOUS TRANSFER SCHEME USING A SINGLE HANDSHAKE

[75] Inventors: John F. Chappel, Mississauga; Michael J. Tresidder, Scarborough, both of Canada

[73] Assignee: LSI Logic Corporation, Milpitas, Calif.

[21] Appl. No.: 08/961,150

[22] Filed: Oct. 30, 1997

[51] Int. Cl.[7] .................................................. G06F 13/00
[52] U.S. Cl. ........................................ 709/237; 709/236
[58] Field of Search .................................. 370/389, 294, 370/285, 280, 282, 278, 276, 277; 709/236, 237; 395/284; 371/15.1

[56] References Cited

U.S. PATENT DOCUMENTS

| | | | |
|---|---|---|---|
| 5,343,427 | 8/1994 | Teruyama | 365/189.04 |
| 5,414,712 | 5/1995 | Kaplan et al. | 371/15.1 |
| 5,471,632 | 11/1995 | Gavin et al. | 395/284 |
| 5,905,725 | 5/1999 | Sindhu et al. | 370/389 |

Primary Examiner—Michael Horabik
Assistant Examiner—Prenell Jones

[57] ABSTRACT

A bi-directional transfer device for transferring packets of data across an asynchronos boundary separating a first time domain includes control logic which utilizes a single handshake signal to both request that the first time domain receive a packet of data from the second time domain, and, acknowledge receipt of an immediately previous packet of data by the second time domain from the first time domain. The device is bi-directional in that for each packet of data sent from one time domain, a corresponding packet of data should then be received from the other time domain. If one time domain has several more packets of data to send than the other time domain, the time domain with fewer packets of data sends invalid packets of data and asserts a signal indicating that the packets of data are invalid. The device is expandable such that two or more packets of data can be simultaneously exchanged across the asynchronous boundary. The device can be used in a method for bi-directionally transferring packets of data across an asynchronous boundary where a single handshake signal is used to request a data packet and acknowledge receipt of an immediately previous data packet.

20 Claims, 8 Drawing Sheets

| STEP | SIDE A | | | SIDE B | | |
|---|---|---|---|---|---|---|
| | DATA$_{AB}$ | REQ$_{AB}$ | ACK$_{BA}$ | DATA$_{AB}$ | REQ$_{AB}$ | ACK$_{BA}$ |
| 1 | X | 0 | 0 | X | 0 | 0 |
| 2 | A | 0 | 0 | X | 0 | 0 |
| 3 | A | 1 | 0 | X | 0 | 0 |
| 4 | A | 1 | 0 | A | 1 | 0 |
| 5 | A | 1 | 0 | A | 1 | 1 |
| 6 | A | 1 | 1 | A | 1 | 1 |
| 7 | A | 0 | 1 | A | 1 | 1 |
| 8 | A | 0 | 1 | A | 0 | 1 |
| 9 | A | 0 | 1 | A | 0 | 0 |
| 10 | A | 0 | 0 | A | 0 | 0 |
| 11 | B | 0 | 0 | A | 0 | 0 |

FIG. 1B (PRIOR ART)

| STEP | SIDE A ||||  SIDE B ||||
| | DATA$_{AB}$ | FIRST TIME DOMAIN |||  DATA$_{AB}$ | SECOND TIME DOMAIN |||
| | | DATA$_{BA}$ | ACK$_A$ | REQ$_A$ | | DATA$_{BA}$ | ACK$_B$ | REQ$_B$ |
|---|---|---|---|---|---|---|---|---|
| 1 | X | X | 0 | 0 | X | X | 0 | 0 |
| 2 | A | X | 0 | 0 | X | X | 0 | 0 |
| 3 | A | X | 0 | 1 | X | X | 0 | 0 |
| 4 | A | X | 0 | 1 | A | X | 1 | 0 |
| 5 | A | X | 0 | 1 | A | B | 1 | 0 |
| 6 | A | X | 0 | 1 | A | B | 1 | 1 |
| 7 | A | B | 1 | 1 | A | B | 1 | 1 |
| 8 | C | B | 1 | 1 | A | B | 1 | 1 |
| 9 | C | B | 1 | 0 | A | B | 1 | 1 |
| 10 | C | B | 1 | 0 | C | B | 0 | 1 |
| 11 | C | B | 1 | 0 | C | D | 0 | 1 |
| 12 | C | B | 1 | 0 | C | D | 0 | 0 |
| 13 | C | D | 0 | 0 | C | D | 0 | 0 |
| 14 | E | D | 0 | 0 | C | D | 0 | 0 |

— 120

BI-DIRECTIONAL ASYNCHRONOUS TRANSFER SCHEME USING A SINGLE HANDSHAKE

FIELD OF THE INVENTION

This invention relates to a device and method to transfer packets of data across an asynchronous boundary separating a first time domain from a second time domain. More particularly, the present invention relates to an improved data transferring device and method to bi-directionally transfer data across an asynchronous boundary.

BACKGROUND OF THE INVENTION

Data transfer devices for transferring data across an asynchronous boundary have been used in the past. In general, these data transfer devices allow a packet of data to be transferred from a first time domain across an asynchronous boundary to a second time domain.

FIG. 1A shows a conventional data transfer device, shown generally by reference numeral 1, for transferring packets of data across an asynchronous boundary 6 from a first time domain to a second time domain. As can be seen from FIG. 1A, two receivers/transmitters, shown generally by reference numerals 2 and 4, are used to transfer data across the asynchronous boundary 6. Each receiver/transmitter 2, 4 can send packets of data across the asynchronous boundary 6 in only one direction. In the device 1 shown in FIG. 1A, the first receiver/transmitter 2 transmits packets of data from the second time domain on Side B of the asynchronous boundary 6 to the first time domain on Side A of the asynchronous boundary 6. The second receiver/transmitter 4 transmits packets of data in the opposite direction from Side A to Side B. Each receiver/transmitter 2, 4 operates independently of the other and has separate request and acknowledge signals, shown in FIG. 1A by the symbols $REQ_{BA}$, $ACK_{BA}$, $REQ_{AB}$, $ACK_{AB}$.

FIG. 1B is a logic table 20 showing the transitions of signals on Side A and Side B during a data transfer from Side A to Side B. As shown in steps 1 to 3 of FIG. 1B, when packet of data A is to be sent from Side A to Side B, the packet of data A is stored in memory unit 8A of the second receiver/transmitter 4 and a request signal $REQ_{AB}$ is sent across the asynchronous boundary 6 from flip flop 9A to synchronizer 12B on Side B. It generally takes two clock cycles on the receiver clock, in this case the clock $CLK_B$ in Time Domain B, to receive the request signal $REQ_{AB}$ from flip flop 9A. Once Side B receives the request signal $REQ_{AB}$ from Side A, Side B uses or latches the packet of data A stored in memory unit 8A.

Once Side B receives packet of data A, Side B asserts an acknowledge signal $ACK_{BA}$ through flip flop 11B which is sent across the asynchronous boundary 6 to synchronizer 10A, as shown in steps 4 to 6 of FIG. 1B. It generally takes two clock cycles of the transmitter clock, in this case the clock $CLK_A$ in the first time domain, to receive the acknowledge signal $ACK_{BA}$. The request signal $REQ_{AB}$ and the acknowledge signal $ACK_{BA}$ are then de-asserted as shown in steps 7 to 10 of FIG. 1B. A second packet of data B can then be stored in memory unit 8A of receiver/transmitter 4, as shown in step 11 of FIG. 1B, to be sent to Side B. If data is to be sent from Side B to Side A, receiver/transmitter combination 2 is used in a similar manner.

It is apparent that the receiver/transmitter combinations 2, 4 each send two handshake signals, namely the $REQ_{BA}$ and $REQ_{AB}$ signals and the $ACK_{AB}$ and $ACK_{BA}$ signals, respectively, to transfer each packet of data across the asynchronous boundary 6. This decreases the efficiency of the prior art systems because at least four clock cycles, two cycles of clock $CLK_A$ in the first time domain and two cycles of clock $CLK_B$ in the second time domain, are required to send each packet of data.

Another disadvantage of the prior art system is that there are a large number of gateways required to send and receive the request signals $REQ_{AB}$, $REQ_{BA}$ and the acknowledge signals $ACK_{AB}$, $ACK_{BA}$. As shown from FIG. 1A, there is a total of twelve flip flops required to effect the flow of data between Side A and Side B. The number of flip flops increases the cost of the device and decreases the available area or real estate on the chip or board upon which the device is installed.

Also, the prior art system is less reliable and prone to metastability failures because of the number of handshake signals $REQ_{AB}$, $REQ_{BA}$, $ACK_{AB}$ and $ACK_{BA}$ required and the number of gateways required to send and receive these handshake signals. A metastability failure results when data or a signal, such as the request signals $REQ_{AB}$, $REQ_{BA}$, or the acknowledge signals $ACK_{AB}$, $ACK_{BA}$, is received at the same time as the receiving clock signal, either $CLK_A$ or $CLK_B$, is changing.

If this happens, the output from the gateway receiving the data or signal is unstable. The amount of time that the gateway is unstable is a decaying function which is a physical characteristic of the flip flop gateway. This decreases the efficiency of the device, and, if the gateway stays unstable until the next cycle of receiving data, circuit failure could result. Therefore, there is a possibility of a metastability failure in the prior art devices each time one of the four handshake signals $REQ_{AB}$, $REQ_{BA}$, $ACK_{AB}$ or $ACK_{BA}$ is received.

SUMMARY OF THE INVENTION

Accordingly, it is an object of this invention to at least partially overcome some of the disadvantages of the prior art. Also, it is an object of this invention to provide an improved type of data transfer device and method to effect transfer of data across an asynchronous boundary more efficiently and reliably.

Accordingly, in one of its aspects, this invention resides in a bi-directional data transfer device for transferring packets of data across an asynchronous boundary separating a first time domain from a second time domain, said device comprising: first memory means located in the first time domain for storing packets of data to be sent from the first time domain to the second time domain; first control means located in the first time domain for sending a first control signal indicative of a request that the second time domain receive one packet of data stored in the first memory means; second memory means located in the second time domain for storing packets of data to be sent from the second time domain to the first time domain; second control means located in the second time domain for sending a second control signal indicative of a request that the first time domain receive one packet of data stored in the second memory means; and wherein receipt of the second control signal by the first control means acknowledges receipt by the second time domain of an immediately previous packet of data from the first time domain.

In a further aspect, the present invention resides in a method for bi-directionally transferring packets of data across an asynchronous boundary separating a first time domain from a second time domain, said method comprising the steps of: (a) storing a packet of data to be sent from the first time domain to the second time domain in a first memory means located in the first time domain; (b) sending a first control signal from the first time domain to the second time domain indicating a request that the second time domain receive one packet of data stored in the first memory means; (c) receiving the one packet of data stored in the first memory means at the second time domain; (d) storing a packet of data to be sent from the second time domain to the first time domain in a second memory means located in the second time domain; and (e) sending a second control signal from the second time domain to the first time domain indicating a request that the first time domain receive one packet of data stored in the second memory means and acknowledging receipt by the second time domain of the one packet of data immediately previously sent from the first time domain.

In a further aspect, the present invention resides in a system for transferring packets of data across an asynchronous boundary separating a first time domain from a second time domain, said system comprising: first control means located in the first time domain for sending a first control signal indicative of a request that the second time domain receive one packet of data from the first time domain and acknowledging receipt by the first time domain of an immediately previous packet of data sent from the second time domain; second control means located in the second time domain for sending a second control signal indicative of a request that the first time domain receive one packet of data from the second time domain and acknowledging receipt by the second time domain of an immediately previous packet of data sent from the first time domain; wherein the first control means receives the second control signal, and the second control means receives the first control signal; wherein when the first control means receives the second control signal, the first time domain sets a sequentially next packet of data for transference to the second time domain, receives a packet of data being sent from the second time domain, and then the first control means sends the first control signal; and wherein when the second control means receives the first control signal, the second time domain sets a sequentially next packet of data for transference to the first time domain, receives a packet of data being sent from the first time domain, and then the second control means sends the second control signal.

Accordingly, the present invention provides a bi-directional asynchronous transfer device and method to transfer packets of data across an asynchronous boundary. In particular, the present invention provides a bi-directional asynchronous transfer device and method which uses a single handshake signal. In one embodiment, the single handshake signal acknowledges receipt of an immediately previous packet of data from a second time domain and requests receipt by the second time domain of a packet of data from the first time domain.

One advantage of the present invention is that the device is less prone to metastability failures. This results at least from the fact that only one handshake signal is required to transfer each packet of data, rather than two handshake signals for each packet of data. This reduces by about one half the probability of a metastability failure occurring.

A further advantage of the present invention is that data can be transferred between two sides with half as many clock cycles because only one handshake signal need be received for each transfer of data.

A further advantage of the present invention is that fewer gateways, and therefore, space is required for a handshake device according to the present invention, thereby decreasing the cost of the device. This also decreases the area or real estate the device requires on the chip or board upon which the device is installed, allowing this area to be used by other devices.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention:

FIG. 1B shows a logic table for a transfer of data using the conventional data transfer device shown in FIG. 1A;

DETAILED DESCRIPTION OF THE PREFERRED EMBODIMENTS

Figure 1A:
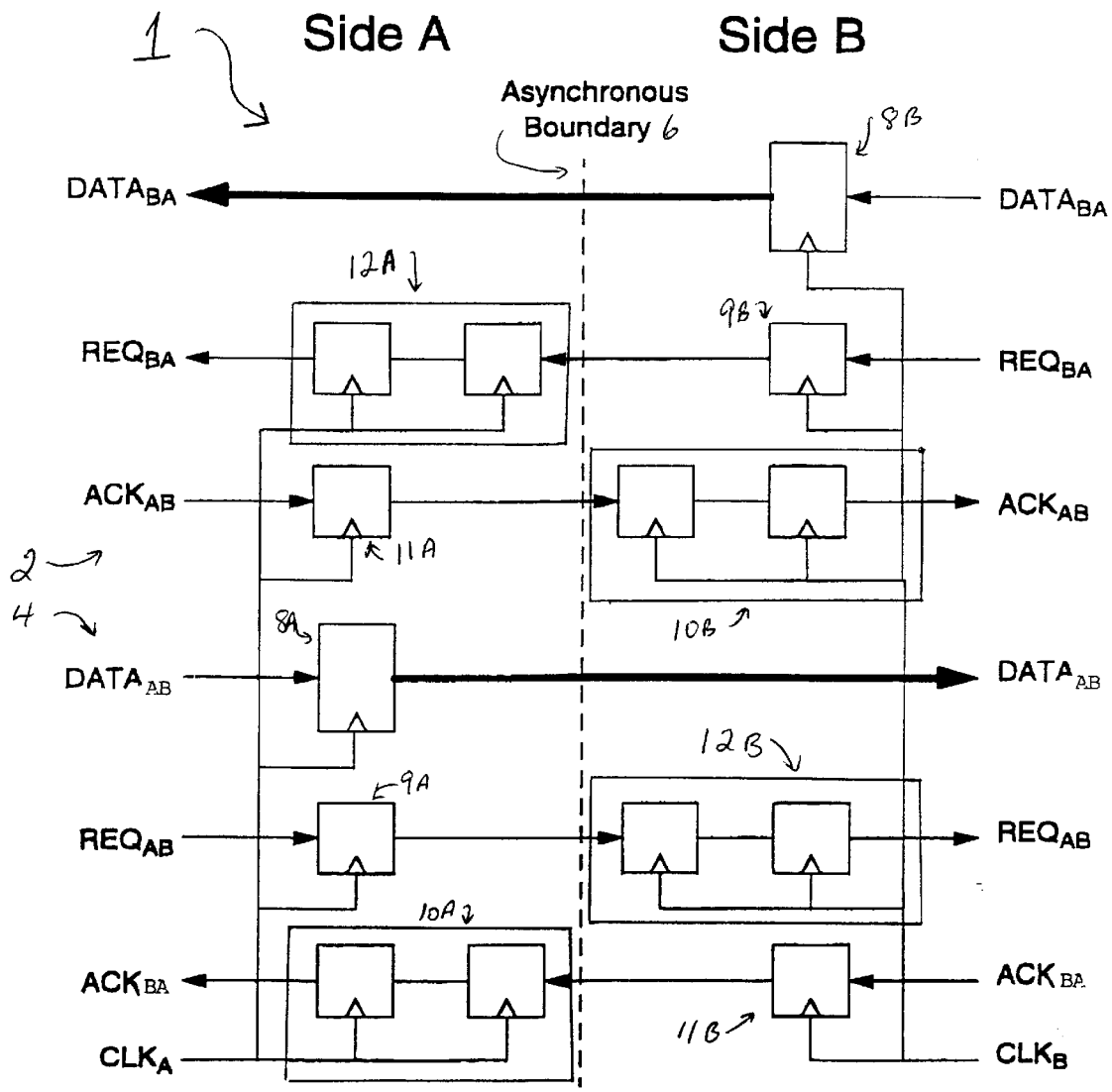
FIG. 1A shows a schematic drawing of a conventional data transfer device to transfer data across an asynchronous boundary.
Figure 2:
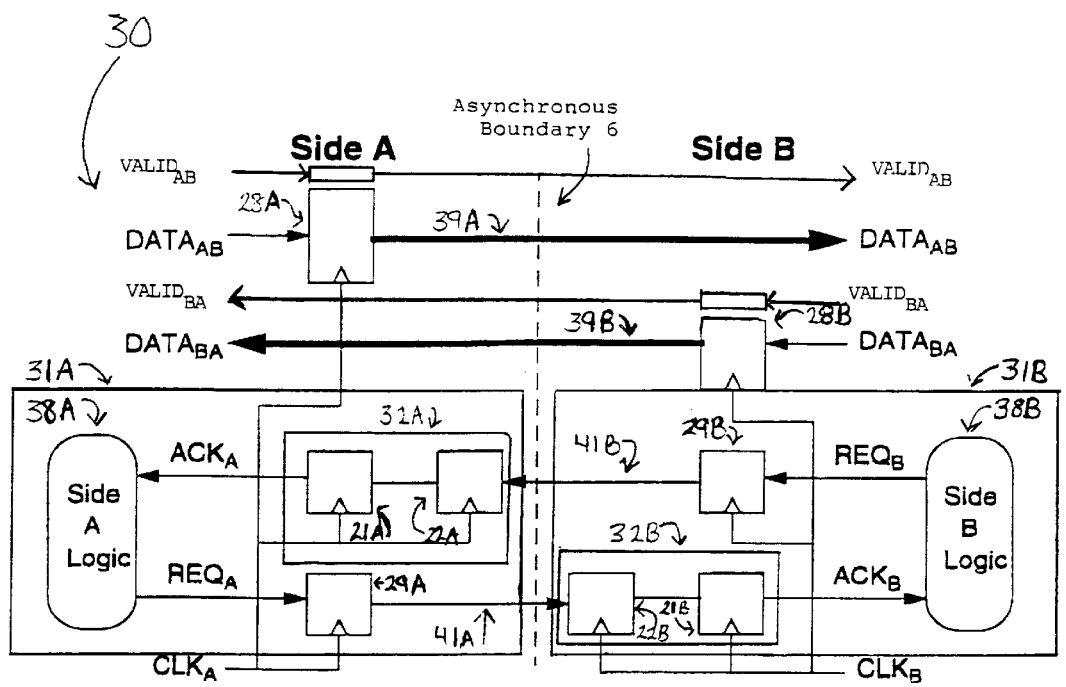
FIG. 2 shows a schematic diagram of a bi-directional asynchronous data transfer device according to one embodiment of the present invention.

FIG. 2 shows a schematic diagram of a bi-directional data transfer device, shown generally by reference numeral 30, according to one embodiment of the present invention. The device 30 is used to transfer packets of data across an asynchronous boundary 6 separating a first time domain, located on Side A of the asynchronous boundary 6, from a second time domain located on Side B of the asynchronous boundary 6. The elements in the first time domain on Side A are connected to the first clock signal $CLK_A$ and the elements in the second time domain on Side B are connected to the second clock signal $CLK_B$. The first clock signal $CLK_A$ need not be synchronous with the second clock $CLK_B$.

Packets of data to be sent from the first time domain on Side A to the second time domain on Side B are stored in the first memory unit 28A located in the first time domain. Likewise, packets of data to be sent from the second time domain to the first time domain are stored in a second memory unit 28B located in the second time domain. In a preferred embodiment, the memory units 28A, 28B are flip-flop gateways sized to store a number of bits corresponding to the number of bits in the packets of data. While the number of bits in the packets of data from the first time domain will usually be the same as the number of bits in the packets of data from the second time domain, this need not be the case. In either case, the first and second memory units 28A, 28B will be sized to store at least the number of bits corresponding to the number of bits in the packets of data being stored therein.

The device 30 further comprises a first control unit 31A located in the first time domain and a second control unit 31B located in the second time domain. The first control unit 31A and the second control unit 31B control the transfer of data across the asynchronous boundary 6, between the first time domain and the second time domain, by sending control signals $REQ_A$ and $REQ_B$ across asynchronous boundary 6.

The first control unit 31A sends the first control signal $REQ_A$, which is indicative of a request that the second time domain receive one packet of data stored in the first memory unit 28A. The first control signal $REQ_A$ is received by the second control unit 31B. Likewise, the second control unit 31B sends a second control signal $REQ_B$, which is indicative of a request that the first time domain receive one packet of data stored in the second memory unit 28B. The second control signal $REQ_B$ is received by the first control unit 31A.

During operation, when both the first time domain and the second time domain have packets of data to send to the other time domain, the first time domain will store packet of data A to be sent to the second time domain in the first memory unit 28A and the first control unit 31A will send the first control signal $REQ_A$ to the second control unit 31B. The packet of data A will be transmitted from the first time domain to the second time domain by a first uni-directional data bus, shown generally by reference numeral 39A, and upon which are sent the first data signals $DATA_{AB}$ which represent the packet of data stored in the first memory unit 28A. Once the second time domain receives the packet of data A being sent from the first time domain, the second control unit 31B will send the second control signal $REQ_B$ to the first control unit 31A. The second control signal $REQ_B$ will indicate a request to the first time domain that the first time domain receive one packet of data B stored in the second memory unit 28B. In addition, receipt of the second control signal $REQ_B$ by the first control unit 31A acknowledges receipt by the second time domain of the immediately previous packet of data A sent from the first time domain to the second time domain. In other words, the second control signal $REQ_B$ serves the dual function of acknowledging receipt of the immediately previous packet of data A from the first time domain, and, requesting that the first time domain receive one packet of data B from the second time domain.

Likewise, upon receipt of the second control signal $REQ_B$, the first time domain will capture the packet of data B being sent from the second time domain as represented by the second data signal $DATA_{BA}$ which are transmitted on a second uni-directional data bus, shown generally by reference numeral 39B. The first time domain will then store a further packet of data C in the first memory unit 28A. This further packet of data C will be the sequentially next packet of data after packet of data A to be sent from the first time domain to the second time domain. Once the sequentially next packet of data B is stored in the memory unit 28A, the first control unit 31A will send a first control signal $REQ_A$ to the second control unit 31B indicating a request that the second time domain receive the packet of data C stored in the first memory unit 28A. Receipt of the first control signal $REQ_A$ by the second control unit 31B will also acknowledge receipt by the first time domain of the immediately previous packet of data B sent from the second time domain to the first time domain. Accordingly, as with the second control signal $REQ_B$, the first control signal $REQ_A$ performs two functions, namely acknowledging receipt by the first time domain of an immediately previous packet of data B sent from the second time domain and requesting that the second time domain receive one packet of data C from the first time domain. The device 30 will continue to send packets of data across the asynchronous boundary 6 between the first time domain and the second time domain in this manner.

It is clear that in order for the device 30 to operate, the first time domain must have a packet of data to send to the second time domain for each packet of data that the second time domain has to send to the first time domain. In the event that the first time domain does not have packets of data to send to the second time domain, the first control unit 31A will nevertheless send the first control signal $REQ_A$ to the second control unit 31B indicating a request that the second time domain receive a packet of data. However, the data represented by the first data signals $DATA_{AB}$ will not be valid because the first time domain does not have any valid packets of data to send to the second time domain.

In order to avoid the second time domain using non-valid data, the first time domain comprises a first validation unit 36A which indicates to the second time domain that the packets of data being transferred from the first time domain are not valid. The first validation unit 36A could, for example, indicate to the second time domain that the packets of data being sent are not valid and should not be used by sending a first validation signal $VALID_{AB}$. In this way, the device 30 can continue to transfer data from the second time domain to the first time domain even when the first time domain does not have valid packets of data to send to the second time domain, but without the second time domain inadvertently using non-valid packets of data from the first time domain.

Likewise, the device 30 comprises a second validation unit 36B located in the second time domain for indicating to the first time domain that packets of data being transferred from the second time domain are not valid when the second time domain does not have a valid packet of data to send to the first time domain. Therefore, if the first time domain has valid packets of data to send to the second time domain, but the second time domain does not have valid packets of data to send to the first time domain, the second validation unit 36B will indicate to the first time domain that the packets of data being sent are non-valid packets of data. The first time domain will then ignore these non-valid packets of data. As with the first validation unit 36A, the second validation unit 36B could, for example, indicate that the packets of data from the second time domain are not valid by sending a second validation signal $VALID_{BA}$.

Figure 3:
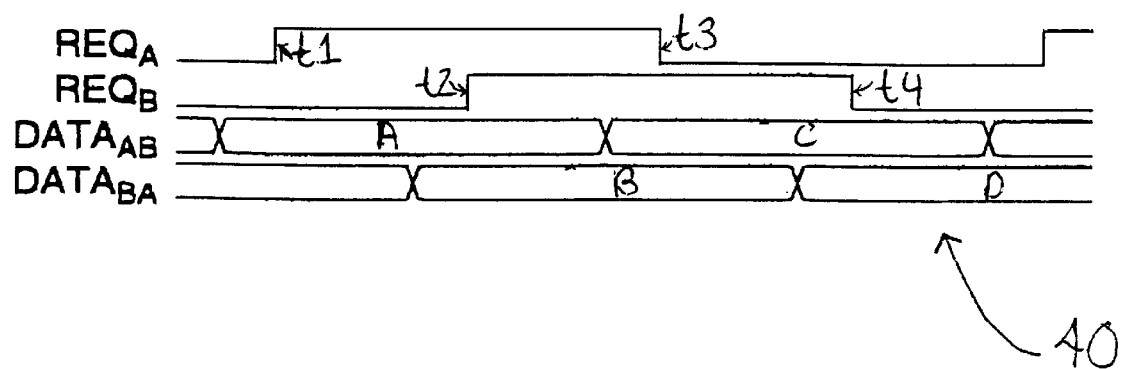
FIG. 3 shows a timing diagram of the signals across the asynchronous boundary of the device shown in FIG. 2 and utilizing a 2-phase data transfer scheme.

FIG. 3 shows a timing diagram 40 showing one possible embodiment of the device 30 shown in FIG. 2. The timing diagram 40 shows the change in the signals across the asynchronous boundary 6 at different points in time.

As shown in FIG. 3, the data buses 39A and 39B transmit first data signals $DATA_{AB}$ corresponding to the packets of data A and C sent from the first time domain to the second time domain, and, second data signals $DATA_{BA}$ corresponding to the packets of data B and D sent from the second time domain to the first time domain, respectively. Likewise, the device 30 comprises a first request line 41A for sending the first control signal $REQ_A$ and a second request line 41B for sending the second request signal $REQ_B$. The first and second request lines 41A, 41B can be any type of line or communication medium for sending the first control signal $REQ_A$ and the second control signal $REQ_B$. As shown in timing diagram 40, the first control signal $REQ_A$ and the second control signal $REQ_B$ can be represented by any transition on the first request line 41A and the second request line 41B, such as from high to low or low to high. The timing diagram 40 is for a device using 2-phase logic and therefore each transition t1, t3, t2, t4 on the first request line 41A and the second request line 41B corresponds to sending the first control signal $REQ_A$ and the second control signal $REQ_B$, respectively.

Figure 4:
FIG. 4 shows a logic table for a transfer of data between Side A and Side B using one embodiment of the present invention shown in FIG. 2 and utilizing a 2-phase data transfer scheme.

FIG. 4 shows a logic table 120 indicating the changes in the signals on both Sides A and B as packets of data, A, B, C and D are sent across the asynchronous boundary 6. The logic table 120 indicates values which are not set or are not known by the letter X and transitions to new values are indicated in bold.

Referring to FIGS. 3 and 4, transfer of packets of data A, B, C and D between the first time domain and the second time domain will be described in more detail. As shown in step 1 of logic table 120, which represents the status immediately after reset of the device 30, both the first control signal $REQ_A$ and the second control signal $REQ_B$ are low, which means that neither the first control unit 31A nor the second control unit 31B, are sending the first control signal $REQ_A$ or the second control signal $REQ_B$.

Eventually, the first time domain will have a packet of data A to send to the second time domain. The packet of data A will be stored in the first memory unit 28A as shown in step 2 of logic table 120. The first bus 39A will then commence transmitting the first data signals $DATA_{AB}$ which represent packet of data A stored in the first memory unit 28A. The first control unit 31A will then send the first control signal $REQ_A$, which is shown in step 3 of logic table 120 by the transition from 0 to 1 in the $REQ_A$ column and the transition t1 from low to high of the first request line 41A in timing diagram 40. The second time domain will then receive or capture the first packet of data A as shown in step 4 of the logic table 120 by a transition from X to A in column $DATA_{AB}$ on Side B of logic diagram 120. The second bus 39B will then commence transmitting the second data signals $DATA_{BA}$ which represent packet of data B stored in the second memory unit 28B.

If the second time domain has a valid packet of data B to send to the first time domain, valid packet of data B will be stored in the second memory unit 28B, shown by the value B appearing in step 5 in column $DATA_{BA}$ of Side B of logic table 120. The second bus 39B will then commence transmitting the second data signals $DATA_{BA}$ which represent packet of data B stored in the second memory unit 28B. The second control unit 31B will then request that the first time domain receive packet of data B. This is shown by the transition 0 to 1 in the column $REQ_B$ of logic table 120 and the transition t2 from low to high of the second request line 41B in time domain 40.

In step 7 of logic table 120, packet of data B is shown being received or captured by the first time domain by the transition in column $DATA_{BA}$ of Side A of logic table 120 from "X" to "B" as requested by the second control signal $REQ_B$. Step 7 of logic table 120 also indicates that the first control unit 31A has received the second control signal $REQ_B$ by a transition from 0 to 1 in column $ACK_A$, which acknowledges receipt by the second time domain of the immediately previous packet of data A from the first time domain.

Once the first time domain receives the second control signal $REQ_B$, acknowledging receipt of the immediately previous packet of data A and requesting receipt of packet of data B, the first time domain can commence the procedure for sending the next packet of data C in the sequence. This is shown at step 8 of logic table 120 by the transition in column $DATA_{AB}$ on Side A from "A" to "C" signifying packet of data C being stored in the first memory unit 28A. The first bus 39A will then commence transmitting the first data signals $DATA_{AB}$ which represent packet of data C, now stored in the first memory unit 28A. In step 9, the first control unit 31A sends the first control signal $REQ_A$, which is shown in step 9 of logic table 120 by the transition in column $REQ_A$ from 1 to 0, and is shown in the timing diagram 40 by the transition t3 from a high to a low value on the first request line 41A.

Step 10 of logic table 120 indicates that the second control signal 31B has received the first control signal $REQ_A$ by a transition from a "1" to "0" in column $ACK_B$. This transition acknowledges receipt by the first time domain of the immediately previous packet of data B sent from the second time domain, and, requests that Side B receive the next packet of data C from the first time domain, which is shown by the transition in column $DATA_{AB}$ on Side B from the value "A" to the value "C".

Because the second time domain has now received an acknowledgement that the first time domain received the immediately previous packet of data B from the second time domain, the second time domain can now send the next packet of data D. This is shown by the transition at step 11 in column $DATA_{BA}$ from "B" to "D" on Side B of logic table 120. This is also shown in the timing drawing 40 by the change in the second data signals $DATA_{BA}$ on the second data bus 39B from the value "B" to the value "D" and the transition t4 on the second request line 41B from a high to a low.

It is clear that the procedure for transferring packets of data A and C from the first time domain to the second time domain and transferring packets of data B and D from the second time domain to the first time domain can be repeated for any number of packets of data. For example, step 14 shows packet of data E being stored in the first memory unit 28A for transmission to the second time domain.

It is understood that the example illustrated in FIGS. 3 and 4 relate to a device 30 operating on "2-phase" logic. In 2-phase logic, the first control signal $REQ_A$ and the second control signal $REQ_B$ is sent each time there is a transition, either from low to high, such as transitions t1 and t2, or high to low, such as transitions t3 and t4, on the first and second request lines 41A and 41B.

In addition to 2-phase logic, the device 30 can operate in 4-phase logic. In 4-phase logic, only transitions from a low to a high are detected such that the first control signal $REQ_A$ and the second control signal $REQ_B$ are sent only when there is a transition from a low to a high on the first request line 41A and the second request line 41B.

In a preferred embodiment, as shown in FIG. 2, the first control unit 31A comprises a synchronizer 32A to receive the second control signal $REQ_B$ from the second control unit 31B. The synchronizer 32A comprises two flip-flop elements 21A and 22A connected in series. The synchronizer 32A receives the second control signal $REQ_B$ and sends it to the Side A logic 38A. The second control signal $REQ_B$ internal to the first control unit 31A is shown as $ACK_A$, the acknowledge signal for Side A. This illustrates that the second control signal $REQ_B$ functions as both an acknowledgement signal for Side A and a request signal for Side B.

The Side A logic 38A generates the first control signal $REQ_A$ which is sent to the second time domain by means of the flip-flop element 29A. The Side A logic 38A will generate the first control signal $REQ_A$ when there is a packet of data to be sent to the second time domain and the packet of data has been stored in the first memory unit 28A.

The second control unit 31B, in a preferred embodiment shown in FIG. 2, has a similar structure to the structure of the first control unit 31A. In particular, the second control unit 31B comprises a synchronizer 32B having two flip-flop elements 22B and 21B. Synchronizer 32B receives the first control signal $REQ_A$ and sends it to the Side B logic 38B. The first control signal $REQ_A$ internal to the second control unit 31B is shown as $ACK_B$, the acknowledge signal for Side B. This illustrates that the first control signal $REQ_A$ performs the dual function of requesting that the second time receive a packet of data and acknowledging receipt by the first time domain of an immediately previous packet of data sent from the second time domain. When there is a packet of data to be sent from the second time domain to the first time domain, the Side B logic 38B will generate the second control signal $REQ_B$ which is sent by flip-flop element 29B once the packet of data to be sent to the first time domain has been stored in the second memory unit 28B.

Figure 5:
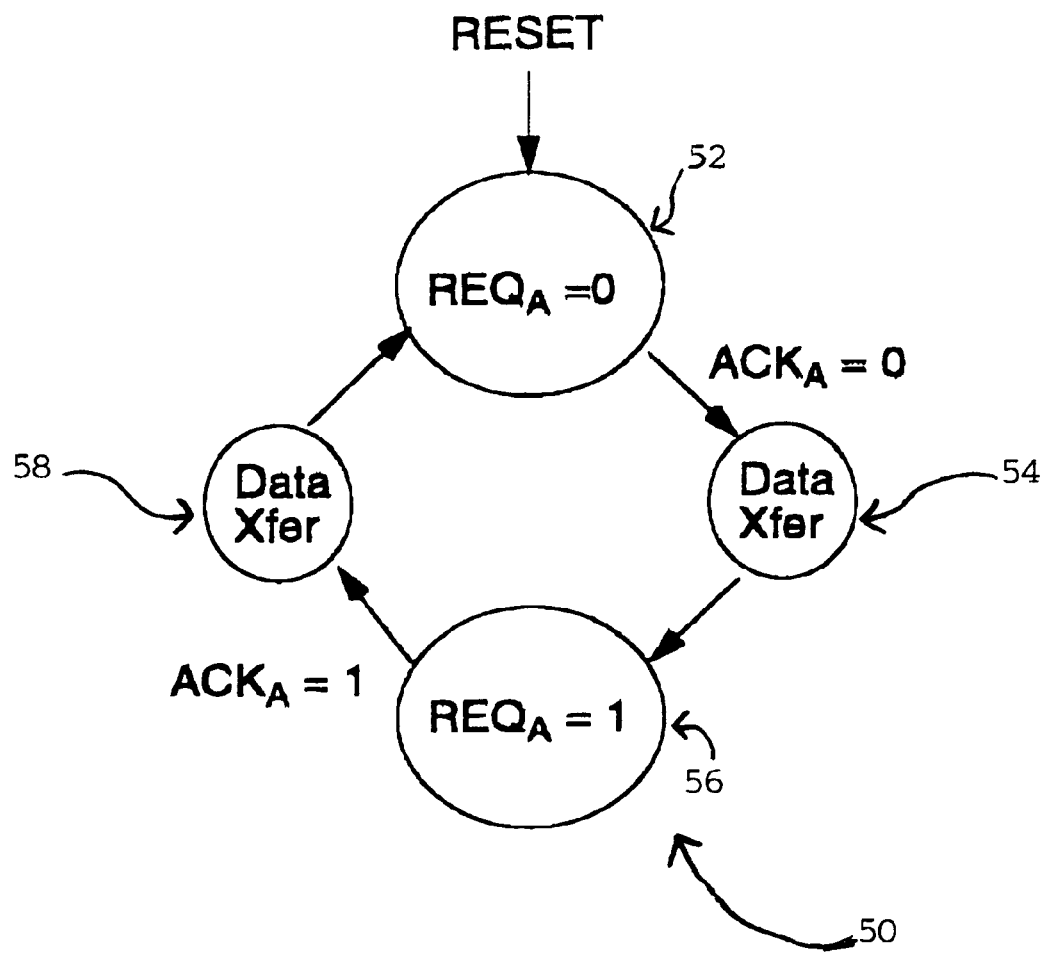
FIG. 5 shows a logic diagram for the Side A logic of the embodiment of the invention shown in FIG. 2 and utilizing a 2-phase data transfer scheme.
Figure 6:
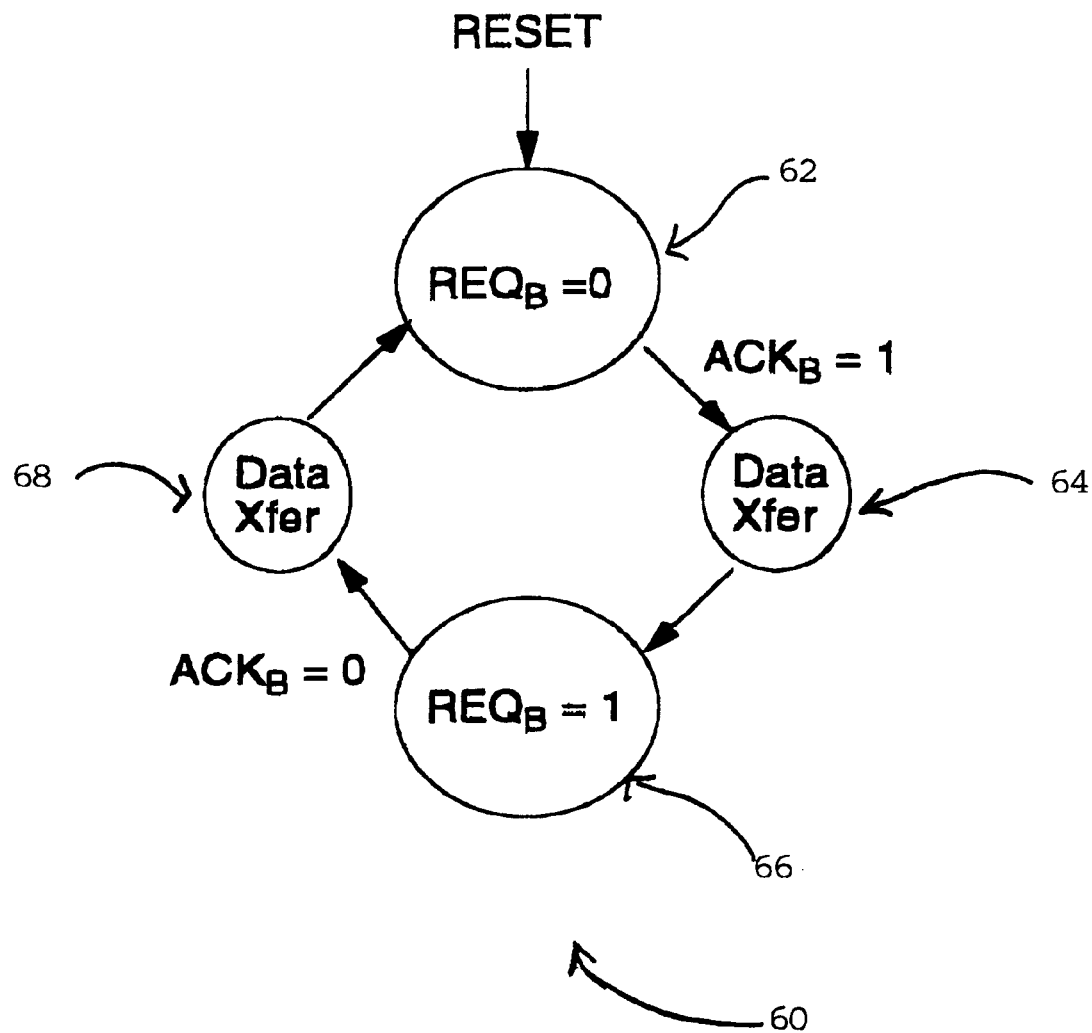
FIG. 6 shows a logic diagram for the Side B logic of the embodiment of the invention shown in FIG. 2 and utilizing a 2-phase data transfer scheme.

FIG. 5 shows a logic diagram 50 for the Side A logic and FIG. 6 shows a logic diagram 60 for the Side B logic. The logic diagrams 50 and 60 are based on 2-phase logic, corresponding to the examples illustrated in FIGS. 3 and 4, and would need to be modified if 4-phase logic was used. However, this modification would be simple to implement.

At reset the first control signal $REQ_A$ and the second control signal $REQ_B$ are not being sent. This is shown by "$REQ_A$=0" in step 52 of FIG. 5 and "$REQ_B$=0" in step 62 of FIG. 6. Because the second control signal $REQ_B$ is not being sent, the first acknowledge signal $ACK_A$ will also be low as shown in step 1 of logic table 120, thereby satisfying the condition represented by the symbol "$ACK_A$=0" in FIG. 5. This allows the Side A logic 38A to proceed to step 54 "Data Xfer". In the data transfer of step 54, the first time domain will receive, by latching or using, the packet of data stored in the second memory unit 28A and the first time domain will store a packet of data in the first memory unit 28A to be sent to the second time domain. The Side A logic 38A will then proceed to step 56 "$REQ_A$=1" which means cause a transition on the first request line 39A, thereby generating the first control signal $REQ_A$.

Receipt of the first control signal $REQ_A$ by the second control unit 31B causes internal acknowledge signal $ACK_B$ to change to "1". This allows the Side B logic 38B to proceed to step 64 "Data Xfer" because the second control signal $REQ_B$ is not equal to the internal acknowledge signal $ACK_B$ ($ACK_B$=1 and $REQ_B$=0). In the data transfer of step 64, the second time domain will receive, by latching or using, the packet of data stored in the first memory unit 28A and will store a next packet of data in the second memory unit 28B to be sent to the first time domain.

The Side B logic 38B then proceeds to step 66 "$REQ_B$=1" which means cause a transition on the second request line 39B, thereby generating the second control signal $REQ_B$. Receipt of the second control signal $REQ_B$ by the first time domain causes internal acknowledge signal $ACK_A$ to change to "1" and satisfies the condition shown in FIG. 6 by the symbol "$ACK_A$=1". This signifies that the second time domain acknowledges receipt of the previous packet of data from the first time domain and requests that the first time domain receive the packet of data stored in memory unit 28B. The Side A logic 38A will now proceed to step 58 "Data Xfer" and permit a data transfer between the first time domain and the second time domain, the same as step 54 "Data Xfer".

After the data transfer of step 58, the Side A logic 38A will then proceed to step 52 and again generate the first control signal $REQ_A$, which is shown in FIG. 5 by "$REQ_A$=0" in step 52. The condition "$ACK_B$=0" in FIG. 6 will then be satisfied, and a further data transfer can occur in the second time domain, shown in step 68 "Data Xfer" in FIG. 6 which is the same as step 64 "Data Xfer".

Steps 62, 64, 66 and 68 and steps 52, 54, 56 and 58 can then be repeated, as shown by the arrows in FIGS. 5 and 6, to continuously transfer data between the first time domain and the second time across the asynchronous boundary 6. For each data transfer, symbolized by steps 54, 58, 64 and 68, the control units 31A, 31B will permit a data transfer to occur by permitting the first or second time domain to receive a packet of data from the other time domain, and store a packet of data for transference to the other time domain.

The Side A logic 38 illustrated in FIG. 5 can be summarized as follows:

Upon reset $REQ_A$=0;

if $REQ_A$=$ACK_A$, commence data transfer, i.e. receive, by latching or using, the packet of data represented by data signals $DATA_{BA}$ and store a next packet of data to be sent to the second time domain into the first memory unit 28A; and generate the first control signal $REQ_A$ by causing a transition of the value on the first request line 41A.

Likewise, the Side B logic 38B can be summarized as follows:

Upon reset, $REQ_B$=0;

if $REQ_B$ is not equal to $ACK_B$, commence data transfer, i.e. receive, by latching or using, the packet of data represented by the signals on data lines $DATA_{AB}$, store a new packet of data to be sent to the first time domain in the second memory unit 28B; and generate the second control signal $REQ_B$ by causing a transition of the value on the second request line 41B.

It is understood that these reset states summarized above and shown in FIGS. 5 and 6 could differ and need not all be 0 or low. The reset state simply determines which time domain will commence transmitting packets of data first. If it is known that at reset a particular time domain will commence transferring packets of data first, then it is preferred that the reset states be set to correspond to that time domain.

Figure 7:
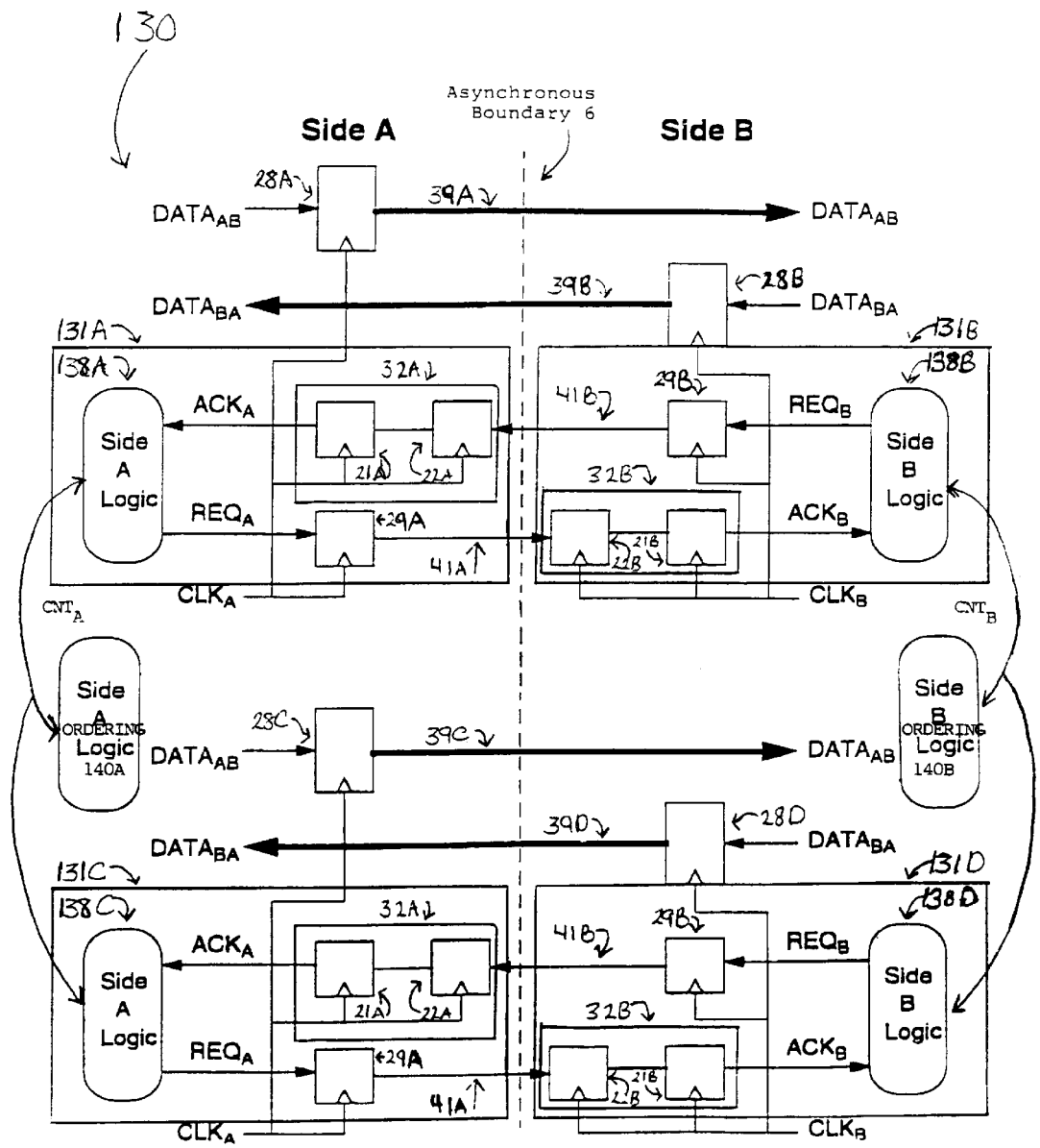
FIG. 7 shows a schematic drawing of a bi-directional data transfer device according to a further embodiment of the present invention permitting multiple data packets to be simultaneously transferred across the asynchronous boundary.

FIG. 7 shows a further bi-directional data transfer device, shown generally by reference numeral 130, according a further embodiment of the present invention. The bi-directional transfer device 130 shown in FIG. 7 permits multiple data packets to be simultaneously transferred across the asynchronous boundary 6 between the first time domain and the second time domain.

As shown in FIG. 7, the device 130 comprises a third memory unit 28C located in the first time domain for storing packets of data to be sent from the first time domain to the second time domain. The device 130 further comprises a third control unit 131C located in the first time domain for sending a third control signal REQC indicative of a request that the second time domain receive one packet of data stored in the third memory unit 28C.

Likewise, the device 130 comprises a fourth memory unit 28D located in the second time domain for storing packets of data to be sent from the second time domain to the first time domain, and, a fourth control unit 131D located in the second time domain for sending a fourth control signal $REQ_D$ indicative of a request that the first time domain receive one packet of data stored in the fourth memory unit 28D.

The third memory unit 28C stores packets of data which are sequentially next after the packet of data which is stored and sent from the first memory unit 28A. In this way, the packets of data to be sent from the first time domain are alternately sent from the first memory unit 28A and the third memory unit 28C. Likewise, the fourth memory unit 28D stores packets of data which are sequentially next after the packets of data stored in the second memory unit 28B. In this way, packets of data sent from the second time domain to the first time domain are sequentially sent from the second memory unit 28B and the fourth memory unit 28D.

Third and fourth control signals $REQ_C$ and $REQ_D$ operate in a similar manner to the first and second control signals $REQ_A$ and $REQ_B$ in that receipt of the fourth control signal $REQ_D$ by the first time domain acknowledges receipt by the second time domain of an immediately previous packet of data from the first time domain. In this case, the fourth control signal $REQ_D$ would acknowledge receipt of the packet of data sent from the third memory unit 28C, because that would have been the source of the immediately previous packet of data. Likewise, receipt of the third control signal $REQ_C$ by the second time domain acknowledges receipt by the first time domain of an immediately previous packet of data from the second time domain. In this embodiment, the third control signal $REQ_C$ would be acknowledging receipt of the immediately previous packet of data from the second time domain, which would have come from the second memory unit 28B, and not from the fourth memory unit 28D. The first control signal $REQ_A$ would acknowledge receipt of the immediately previous packet of data from the second time domain, which would have been stored in the fourth memory unit 28D.

The control units 131A, 131B, 131C and 131D are similar to the control units 31A and 31B described above with respect to the embodiments shown in FIGS. 2 to 6. As shown from FIG. 7, the control units 131A, 131B, 131C and 131D comprise synchronizers 32A, 32B, 32C and 32D, which operate in the same manner as synchronizers 32A and 32B of the embodiment shown in FIG. 2. Likewise, the flip-flops 29A, 29B, 29C and 29D operate in the same manner as flip-flops 29A and 29B of the embodiments shown in FIG. 2.

However, the Side A logic 138A and 138C for control units 131A and 131C will operate differently than the Side A logic 38A shown in FIG. 2. In particular, the Side A logic 138A and 138C will receive ordering signals CNTA from Side A ordering logic 140A to maintain the predetermined order of the data packs as they are transferred across the asynchronous boundary 6. Likewise, the Side B logic 138B and 138D will receive and send ordering signals $CNT_B$ from Side B ordering logic 140B to maintain the predetermined order of the packets of data as they are transferred across the asynchronous boundary 6.

Therefore, the device 130 further comprises ordering logic 140a and 140B which ensure that the packets of data retain their predetermined order even though they are transferred across the asynchronous boundary 6 by different memory units 28A, 28B, 28C and 28D. The ordering logic 140A and 140B and the method for maintaining the order of the packets of data are more fully described in co-pending application Ser. No. 08/961,206 entitled "Asynchronous Data Transfer Scheme Using Multiple Channels" invented by the same inventors as this invention and assigned to the same assignor, and which is incorporated herein by reference.

While FIG. 7 discloses a device 130 having two channels such that two packets of data can be transferred across the asynchronous boundary 6 at any one time, it is understood that the present invention is not limited to only two channels. Rather, the present invention encompasses devices with a plurality of channels such as 3, 4 or more, as disclosed in the co-pending application.

It is understood that the present invention can be incorporated in a chip, a core within a chip, partitioned between multiple chips, or electronic elements on a board or partitioned between multiple boards or multiple systems.

It is further understood that the present invention can be used to transfer packets of data across any asynchronous boundary 6. For example, the asynchronous boundary 6 could be located across buses within a system, or, on a board having an independent clock and a bus in a system. Without limiting the foregoing, the present invention could be used to transfer data across an asynchronous boundary 6 located between a video board and a peripheral component interface (PCI) bus. The present invention could also be used to transfer data across an asynchronous boundary 6 separating two networks, each network operating in its own time domain.

It is further understood that while the control units 31A, 31B, 131A, 131B, 131C and 131D have been disclosed in a preferred embodiment comprising flip flop gateways, the control units 31A, 31B, 131A, 131B, 131C and 131D are not limited to this arrangement. Rather, the control units 31A, 31B, 131A, 131B, 131C and 131D can comprise any type of electronic elements which will provide the functional or electrical equivalent, such as ANDgates, ORgates, latches or other electronic components.

Furthermore, it is understood that in one preferred embodiment the memory units 28A, 28B, 28C and 28D have been disclosed comprising flip-flop gateways, but the memory units 28A, 28B, 28C and 28D need not comprise latches. Rather, the memory units 28A, 28B, 28C and 28D can comprise any type of memory storage devices, such as registers or Random Access Memory (RAM) or latches which can store packets of data to be sent across the asynchronous boundary 6.

Likewise, it is understood that the first data signal $DATA_{AB}$ and the second data signal $DATA_{BA}$ need not be transferred across the asynchronous boundary 6 on unidirectional data buses 39A, 39B. Rather, any type of data buses, or transmission medium, such as fibre optics, could be used to transfer the data signals $DATA_{AB}$, $DATA_{BA}$ across the asynchronous boundary 6.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

We claim:

1. A bi-directional data transfer device for transferring packets of data across an asynchronous boundary separating a first time domain from a second time domain, said device comprising:

first memory means located in the first time domain for storing packets of data to be sent from the first time domain to the second time domain;

first control means located in the first time domain for sending a first control signal indicative of a request that the second time domain receive one packet of data stored in the first memory means;

second memory means located in the second time domain for storing packets of data to be sent from the second time domain to the first time domain;

second control means located in the second time domain for sending a second control signal indicative of a request that the first time domain receive one packet of data stored in the second memory means and an acknowledgment of receipt by the second time domain of an immediately previous packet of data from the first time domain; and wherein receipt of the second control signal by the first control means acknowledges receipt by the second time domain of the immediately previous packet of data from the first time domain.

2. The bi-directional data transfer device as defined in claim 1 wherein receipt of the first control signal by the second control means acknowledges receipt by the first time domain of an immediately previous packet of data from the second time domain.

3. The bi-directional data transfer device as defined in claim 2 wherein the first memory means comprises a first flip-flop gateway and the second memory means comprises a second flip-flop gateway.

4. The bi-directional data transfer device as defined in claim 3 wherein the first flip-flop gateway is sized to store a number of bits corresponding to a number of bits in the packets of data transferred from the first time domain to the second time domain and the second flip-flop gateway is sized to store a number of bits corresponding to a number of bits in the packets of data transferred from the second time domain to the first time domain.

5. The bi-directional data transfer device as defined in claim 2 wherein the packets of data from the first time domain are transferred to the second time domain by a first un-idirectional bus and the packets of data from the second time domain are transferred to the first time domain by a second uni-directional bus, separate from the first uni-directional bus.

6. The bi-directional data transfer device as defined in claim 2 further comprising:

of first validation means located in the first time domain indicating to the second time domain that packets of data being transferred from the first time domain are not valid; and wherein if the second time domain has packets of data to send to the first time domain but the first time domain does not have valid packets of data to send to the second time domain, the first time domain sends a non-valid packet of data to the second time domain upon receipt by the first time domain of a valid packet of data from the second time domain and the first validation means indicates the packet of data is not valid.

7. The bi-directional data transfer device as defined in claim 6 further comprising:

second validation means located in the second time domain for indicating to the first time domain that packets of data being transferred from the second time domain are not valid; and wherein if the first time domain has packets of data to send to the second time domain but the second time domain does not have valid packets of data to send to the first time domain, the second time domain sends a non-valid packet of data to the first time domain upon receipt by the second time domain of a valid packet of data from the first time domain and the second validation means indicates the packets of data are not valid.

8. The bi-directional data transfer device as defined in claim 2 wherein immediately after reset, the first control means is not sending the first control signal and the second control means is not sending the second control signal.

9. The bi-directional data transfer device as defined in claim 8 wherein said first control means comprises first logic means for generating the first control signal, for permitting data transfers between the first time domain and the second time domain and for receiving the second control signal;

wherein said second control means comprises second logic means for generating the second control signal, for permitting data transfers between the first time domain and the second time domain and for receiving the first control signal;

wherein when the first logic means receives the second control signal, the first logic means permits a data transfer between the first time domain and the second time domain and then generates the first control signal; and wherein when the second logic means receives the first control signal, the second logic means permits a data transfer between the second time domain and the first time domain and then generates the second control signal.

10. The bi-directional data transfer device as defined in claim 9 wherein:

the first control signal comprises a transition on a first request line;

the second control signal comprises a transition on a second request line; and wherein immediately after reset, both the first request line and the second request line have a predetermined state.

11. The bi-directional data transfer device as defined in claim 2 wherein the first control means comprises a first flip flop connected in series with a second flip flop for receiving the second control signal and a third flip flop for sending the first control signal; and wherein the second control means comprises a fourth flip flop connected in series with a fifth flip flop for receiving the first control signal and a sixth flip flop for sending the second control signal.

12. The bi-directional data transfer device as defined in claim 2 further comprising:

third memory means located in the first time domain for storing packets of data to be sent from the first time domain to the second time domain;

third control means located in the first time domain for sending a third control signal indicative of a request that the second time domain receive one packet of data stored in the third memory means;

fourth memory means located in the second time domain for storing packets of data to be sent from the second time domain to the first time domain;

fourth control means located in the second time domain for sending a fourth control signal indicative of a request that the first time domain receive one packet of data stored in the fourth memory means; and wherein the third memory means stores a packet of data which is sequentially next after the packet of data stored in the first memory means and the fourth memory means stores a packet of data which is sequentially next after the packet of data stored in the second memory means; and wherein receipt of the fourth control signal by the first time domain acknowledges receipt by the second time domain of an immediately previous packet of data from the first time domain.

13. A method for bi-directionally transferring packets of data across an asynchronous boundary separating a first time domain from a second time domain, said method comprising the steps of:

(a) storing a packet of data to be sent from the first time domain to the second time domain in a first memory means located in the first time domain;

(b) sending a first control signal from the first time domain to the second time domain indicating a request that the second time domain receive one packet of data stored in the first memory means;

(c) receiving the one packet of data stored in the first memory means at the second time domain;

(d) storing a packet of data to be sent from the second time domain to the first time domain in a second memory means located in the second time domain; and (e) sending a second control signal from the second time domain to the first time domain indicating a request that the first time domain receive one packet of data stored in the second memory means and acknowledging receipt by the second time domain of the one packet of data immediately previously sent from the first time domain.

14. The method for bi-directionally transferring packets of data as defined in claim 13 further comprising the steps of:

(f) receiving the one packet of data from the second time domain at the first time domain;

(g) storing in the first memory means a sequentially next packet of data to be sent from the first time domain to the second time domain; and (h) sending the first control signal to the second time domain indicating a request that the second time domain receive the sequentially next packet of data stored in the first memory means and acknowledging receipt by the first time domain of the one packet of data immediately previously sent from the second time domain.

15. The method for bi-directionally transferring packets of data as defined in claim 14 further comprising the steps of:

(i) receiving the sequentially next packet of data stored in the first memory means from the first time domain at the second time domain;

(j) storing in the second memory means a sequentially next packet of data to be sent from the second time domain to the first time domain;

(k) sending the second control signal to the first time domain indicating a request that the first time domain receive one packet of data stored in the second memory means and acknowledging receipt by the second time domain of the one packet of data immediately previously sent from the first time domain; and (l) repeating steps (g) to (k) for each packet of data to be sent across the asynchronous boundary.

16. The method for bi-directionally transferring packets of data as defined in claim 15 further comprising the steps of:

if the first time domain receives a packet of data from the second time domain, but the first time domain does not have a valid packet of data to send to the second time domain, storing invalid data in the first memory means to be sent from the first time domain to the second time domain;

sending a first control signal to the second time domain indicating acknowledgment of receipt of a packet of data immediately previously received from the second time domain and requesting that the second time domain receive one packet of data stored in the first memory means; and sending a not valid signal from the first time domain to the second time domain indicating that the packet of data being sent from the first memory means is not valid data.

17. The method for bi-directionally transferring packets of data as defined in claim 16, wherein the first memory means comprises a first flip-flop gateway and the second memory means comprises a second flip-flop gateway.

18. The method for bi-directionally transferring packets of data as defined in claim 16, wherein the first control signal is sent from a first control means located in the first time domain, said first control means comprising a first flip flop connected in series with a second flip flop for receiving the second control signal and a third flip flop for sending the first control signal; and wherein the second control signal is sent from a second control means located in the second time domain, said second control means comprising a fourth flip flop connected in series with a fifth flip flop for receiving the first control signal and a sixth flip flop for sending the second control signal.

19. A system for transferring packets of data across an asynchronous boundary separating a first time domain from a second time domain, said system comprising:

first control means located in the first time domain for sending a first control signal indicative of a request that the second time domain receive one packet of data from the first time domain and acknowledging receipt by the first time domain of an immediately previous packet of data sent from the second time domain;

second control means located in the second time domain for sending a second control signal indicative of a request that the first time domain receive one packet of data from the second time domain and acknowledging receipt by the second time domain of an immediately previous packet of data sent from the first time domain;

wherein the first control means receives the second control signal, and the second control means receives the first control signal;

wherein when the first control means receives the second control signal, the first time domain sets a sequentially next packet of data for transference to the second time domain, receives a packet of data being sent from the second time domain, and then the first control means sends the first control signal; and wherein when the second control means receives the first control signal, the second time domain sets a sequentially next packet of data for transference to the first time domain, receives a packet of data being sent from the first time domain, and then the second control means sends the second control signal.

20. The system for transferring packets of data as defined in claim 19 further comprising:

first memory means located in the first time domain for storing data;

a first uni-directional bus connected to the first memory means for sending first data signals corresponding to the packet of data stored in the first memory means to the second time domain;

second memory means located in the second time domain for storing data;

a second uni-directional bus connected to the second memory means for sending second data signals corresponding to the packet of data stored in the second memory means to the first time domain;

wherein the sequentially next packet of data for transference to the second time domain is set by storing the sequentially next packet of data in the first memory means; and wherein the sequentially next packet of data for transference to the first time domain is set by storing the sequentially next packet of data in the second memory means.

* * * * *